M. A. THOMPSON.
RAT TRAP.
APPLICATION FILED NOV. 23, 1914.
1,173,897.
Patented Feb. 29, 1916.
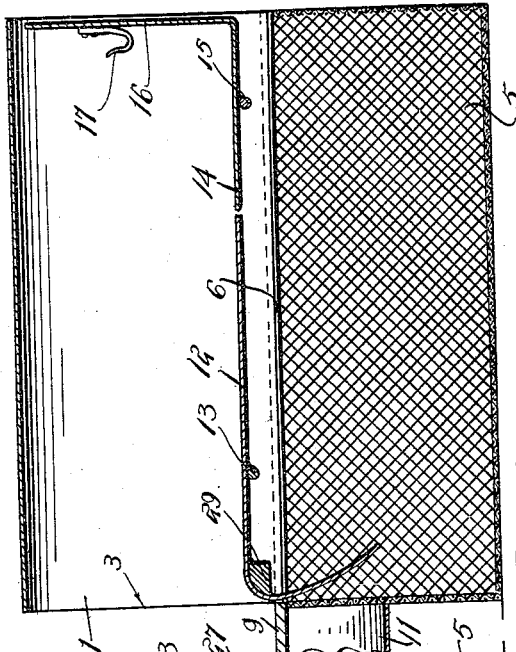
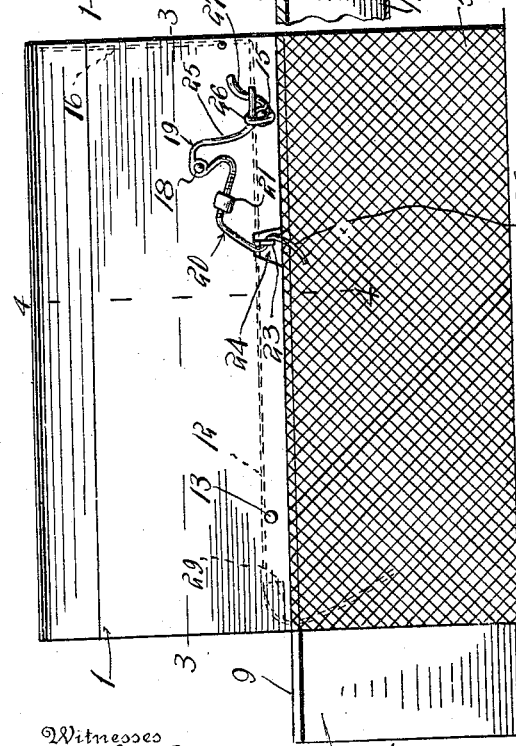
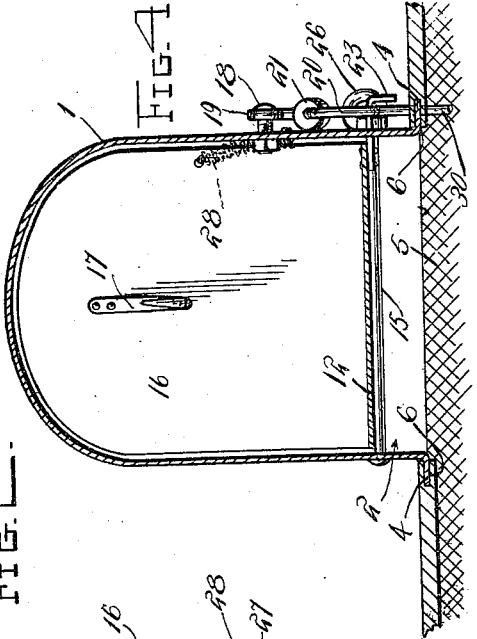
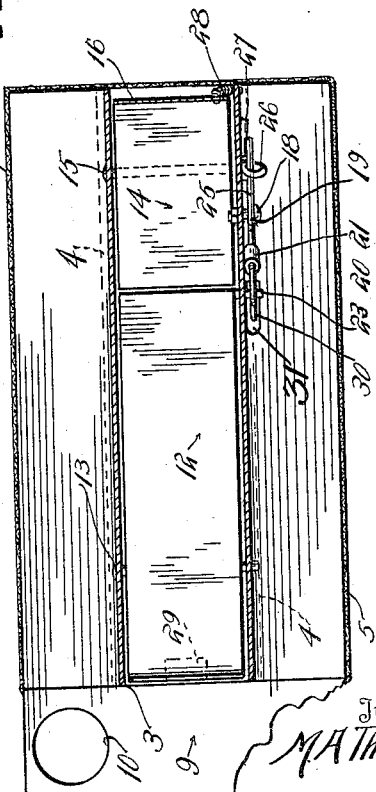
Witnesses
J. C. Simpson
Inventor
M A Thompson
By
Attorneys

UNITED STATES PATENT OFFICE.

MARTIN A. THOMPSON, OF OTHO, IOWA.

RAT-TRAP.

1,173,897. Specification of Letters Patent. Patented Feb. 29, 1916.

Application filed November 23, 1914. Serial No. 873,590.

*To all whom it may concern:*

Be it known that I, MARTIN A. THOMPSON, a citizen of the United States, residing at Otho, in the county of Webster, State of Iowa, have invented certain new and useful Improvements in Rat-Traps; and I do hereby declare the following to be a full, clear, and exact description of the invention, such as will enable others skilled in the art to which it appertains to make and use the same.

This invention relates to a rat trap.

An object of the invention is to provide a trap into which the rat or other animals may enter and which will be automatically locked and thus maintain the said rat within the same.

A further object of the invention is to provide a chamber in which the rat will be precipitated after having been caught in the trap.

A further object of the invention is to so construct the device that the operation will be continuous, the rat operating the device to cause the same to precipitate him into the containing chamber and the movable parts being returnable to their initial positions so that the trap proper will be again opened.

With these and other objects in view, such as will appear as the description progresses, my invention comprises the combination and arrangement of parts as set forth in and falling within the scope of the appended claims.

Referring to the drawing: Figure 1 is a side elevation of my device, showing the trap opened and ready for operation. Fig. 2 is a sectional view showing the arrangement of the doors. Fig. 3 is a section on line 3—3 of Fig. 1. Fig. 4 is a section on line 4—4 of Fig. 1.

Referring to the drawing wherein like parts are indicated by like characters throughout the several views:—my device comprises a casing 1 having an open bottom 2 and end 3 and outwardly extending flanges 4 on the lower edges of the sides thereof. This casing is removably mounted on a wire cage 5 having grooves 6 in the top thereof into which the flanges 4 of the casing 1 slide.

In order that rats may enter the open end 3 of the casing 1, I have provided a platform 9 in the plane of the top of the cage and extending outwardly therefrom in front of the open end 3 of the casing 1. This platform 9 has a hole 10 in one end thereof below which is arranged a runway 11 in inclined position so that the animals will ascend the runway and thus mount the platform 9 through the hole 10. This runway 11 is made preferably detachable from the platform 9 for a purpose which will later appear.

In order that rats may be precipitated into the cage 5 after having entered the casing 1 through the open end 3, I have provided a false bottom for the casing 1 which consists of a member 12 pivoted to the sides of the casing 1, as at 13, so as to close a portion of the open bottom thereof. In alinement with this member 12 is an additional member 14, secured to a shaft 15 which is rotatably mounted in and extends through the sides of the casing 1. The rear end of this member 14 extends upwardly, as at 16. to normally close the rear end of the casing and has a bait hook 17 thereon.

Pivotally mounted, as at 18, on the outer face of the casing 1 is a lever 19 having extended to one side of its pivot a portion 20 on which is adjustably mounted a counterweight 21 and on the lower end of which is a hook-shaped portion which is adapted to engage a clip 23 on the inner end of the member 12, which clip extends through a slot 24, to normally maintain the said member in a horizontal position. To the other side of the pivot 18 is formed in the lever 19 a curved portion 25 over which engages a loop 26 secured to the end of the shaft 15 and having a counterweight portion 27.

When a rat enters the casing 1 the lever 19 maintains the member 12 of the false bottom in a horizontal position until the rat steps upon the member 14 at which time this member is moved downwardly about its pivot against the tension of a spring 28, which normally tends to maintain the member 14 in a horizontal position and the rat is thus precipitated into the cage 5. At the same time the inner end of the member 12 is pushed downwardly because of the fact that part of the weight of the rat is thereon, against the tension of a counterweight 29. This action is allowed because of the fact that as the inner end of the member 14 swings downwardly the loop 26 rides upon the curved portion 25 of the lever 19 and thus disengages the hook-shaped portion of the said lever from the clip 23.

After the weight of the rat is relieved from the members 12 and 14 the counterweight on the member 12 and the spring 28 on the member 14 swing these members to their initial horizontal position and thus close the cage 5.

When the members 12 and 14 are in their tilted positions the counterweight 21 swings the hook-shaped end of the lever 19 into the path of movement of the clip 23 so that upon the upward movement of the inner end of the member 12 this clip strikes a cam surface 30 on the end of the portion 20 of the lever 19 and working through a slot 31 in the top of the cage 5, and through a similar slot in the adjacent flange 4 of the casing 1, thereby pushing the hook-shaped end aside until the said member 12 reaches its horizontal position at which time the counterweight 21 will again swing this portion beneath the clip 23 and thus lock the members 12 and 14 in their operative or initial positions.

When it is desirable to empty the cage 5 the casing 1 is detached therefrom and the latter then inverted as is readily apparent.

While I have illustrated and described a particular embodiment of my invention, I have merely done so for the sake of convenience and I do not wish to be limited to that particular embodiment as it is obvious that numerous changes may be made in the details of construction thereof without in any way departing from the spirit of the invention or exceeding the scope of the appended claims.

What I claim is:—

1. A rat trap comprising a rectangular casing having an open end and bottom, a false bottom consisting of a plurality of members pivotally mounted therein and normally lying in a horizontal plane, a clip on the inner end of one of the members, a lever pivotally mounted on the outside of said casing and having a hook on one end thereof arranged to engage the aforementioned clip, a loop secured to the other of the said members and engaging the said lever, a coil spring secured to the last mentioned member constructed and arranged to normally maintain the said member in a horizontal position, the said lever and loop being so arranged that when additional weight is applied to the last mentioned member the aforementioned loop will be disengaged from the clip.

2. A rat trap comprising a casing, a cage, the said casing being detachably mounted on the said cage, a false bottom in said casing consisting of a plurality of pivotally mounted members, a loop secured to one of said members at its pivotal point, a lever pivoted to the outside of said casing and having a portion thereof extending through said loop, the said lever having another portion thereof formed in hook-shape, a clip on the other of said members arranged to engage said hook-shaped portion of the said lever, a coil spring secured to the first mentioned member and to the casing to normally maintain the said members in a horizontal position.

In testimony whereof, I affix my signature, in the presence of two witnesses.

MARTIN A. THOMPSON.

Witnesses:
O. M. OLESON,
M. F. SKEEN.

Copies of this patent may be obtained for five cents each, by addressing the "Commissioner of Patents, Washington, D. C."